US012789303B2

(12) United States Patent
Takahashi

(10) Patent No.: US 12,789,303 B2
(45) Date of Patent: Nov. 10, 2026

(54) COUPLING DEVICE AND CLAMPING DEVICE

(71) Applicant: PASCAL ENGINEERING CORPORATION, Itami (JP)

(72) Inventor: Takuya Takahashi, Itami (JP)

(73) Assignee: PASCAL ENGINEERING CORPORATION, Itami (JP)

( * ) Notice: Subject to any disclaimer, the term of this patent is extended or adjusted under 35 U.S.C. 154(b) by 280 days.

(21) Appl. No.: 18/696,046

(22) PCT Filed: Aug. 18, 2022

(86) PCT No.: PCT/JP2022/031192
§ 371 (c)(1),
(2) Date: Mar. 27, 2024

(87) PCT Pub. No.: WO2023/053761
PCT Pub. Date: Apr. 6, 2023

(65) Prior Publication Data

US 2024/0391040 A1 Nov. 28, 2024

(30) Foreign Application Priority Data

Sep. 28, 2021 (JP) ................................ 2021-158020

(51) Int. Cl.
*B23Q 3/00* (2006.01)
*B23Q 1/44* (2006.01)

(52) U.S. Cl.
CPC ..................................... *B23Q 1/44* (2013.01)

(58) Field of Classification Search
CPC ... B23Q 1/44; B23Q 1/36; B23Q 3/00; B23Q 3/06; B23Q 3/082
See application file for complete search history.

(56) References Cited

U.S. PATENT DOCUMENTS

2009/0314113 A1 12/2009 Wang et al.
2010/0308524 A1 12/2010 Kitaura et al.
(Continued)

FOREIGN PATENT DOCUMENTS

CN 201030554 Y 7/2008
CN 101925439 A 12/2010
(Continued)

OTHER PUBLICATIONS

Extended European Search Report for European Application No. 22875634.2, dated Jul. 22, 2025.
(Continued)

*Primary Examiner* — Lee D Wilson
(74) *Attorney, Agent, or Firm* — Birch, Stewart, Kolasch & Birch, LLP

(57) ABSTRACT

A coupling device includes a fluid pressure cylinder fixed to the first member. The fluid pressure cylinder includes a cylinder main body, a first piston and a second piston each reciprocally movable with respect to the cylinder main body along a first direction, and a biasing member that drives each of the first piston and the second piston to one side in the first direction. The cylinder main body has a first cylinder chamber that drives the first piston to the other side in the first direction, and a second cylinder chamber that is formed to be separated from the first cylinder chamber and that drives the second piston to the other side.

12 Claims, 7 Drawing Sheets

(56) References Cited

U.S. PATENT DOCUMENTS

| | | | | |
|---|---|---|---|---|
| 2012/0174351 | A1 | 7/2012 | Haruna | |
| 2013/0042443 | A1 | 2/2013 | Kawakami | |
| 2018/0031011 | A1 | 2/2018 | Kudo et al. | |
| 2021/0190236 | A1* | 6/2021 | Haruna | B23Q 1/009 |
| 2022/0314383 | A1* | 10/2022 | Yoshimura | B23Q 3/108 |
| 2024/0391040 | A1* | 11/2024 | Takahashi | B23Q 1/44 |

FOREIGN PATENT DOCUMENTS

| | | | |
|---|---|---|---|
| CN | 102574254 | A | 7/2012 |
| CN | 110886927 | A | 3/2020 |
| EP | 2 239 089 | A1 | 10/2010 |
| JP | 11-333848 | A | 12/1999 |
| JP | 2007-85492 | A | 4/2007 |
| JP | 2010-99785 | A | 5/2010 |
| JP | 2011-235364 | A | 11/2011 |
| JP | 2018-449 | A | 1/2015 |
| JP | 2016-223473 | A | 12/2016 |
| JP | 2018-1380 | A | 1/2018 |
| JP | 2018-3958 | A | 1/2018 |
| JP | 2018-17269 | A | 2/2018 |
| JP | 3219895 | U | 1/2019 |
| WO | WO 2011/048039 | A1 | 4/2011 |
| WO | WO 2021/177385 | A1 | 9/2021 |

OTHER PUBLICATIONS

Japanese Office Action for Japanese Application No. 2021-158020, dated Jul. 29, 2025, with English translation.
International Search Report (PCT/ISA/210) issued in PCT/JP2022/031192, dated Oct. 18, 2022.
Chinese Office Action and Search Report for Chinese Application No. 202280064717.5, dated Apr. 7, 2026, with English translation.

* cited by examiner

COUPLING DEVICE AND CLAMPING DEVICE

TECHNICAL FIELD

The present technology relates to a coupling device and a clamping device.

BACKGROUND ART

There has been conventionally known a device that fixes a movable member such as a work pallet with the movable member being aligned with a reference member such as a table of a machining center (for example, PTL 1 and PTL 2 described below).

CITATION LIST

Patent Literature

PTL 1: WO 2011/046039
PTL 2: Japanese Utility Model Registration No. 3219695

SUMMARY OF INVENTION

Technical Problem

It is required to increase coupling force of a coupling device or clamping force of a clamping device. On the other hand, the coupling device is also required to have a reduced size.

It is an object of the present technology to provide a coupling device and a clamping device each having a reduced size while attaining increased coupling force or clamping force.

Solution to Problem

A coupling device according to the present technology is a coupling device that is able to couple a first member and a second member while positioning the first member and the second member with respect to each other, and includes a fluid pressure cylinder fixed to the first member.

A clamping device according to the present technology is a clamping device that is able to fix a second member to a first member, and includes a fluid pressure cylinder fixed to the first member.

The fluid pressure cylinder includes a cylinder main body, a first piston and a second piston each reciprocally movable with respect to the cylinder main body along a first direction, and a biasing member that drives each of the first piston and the second piston to one side in the first direction. The cylinder main body has a first cylinder chamber that drives the first piston to the other side in the first direction, and a second cylinder chamber that is formed to be separated from the first cylinder chamber and that drives the second piston to the other side.

Advantageous Effects of Invention

According to the present technology, each of the coupling device and the clamping device can have a reduced size while attaining increased coupling force or clamping force.

DESCRIPTION OF EMBODIMENTS

Figure 1:
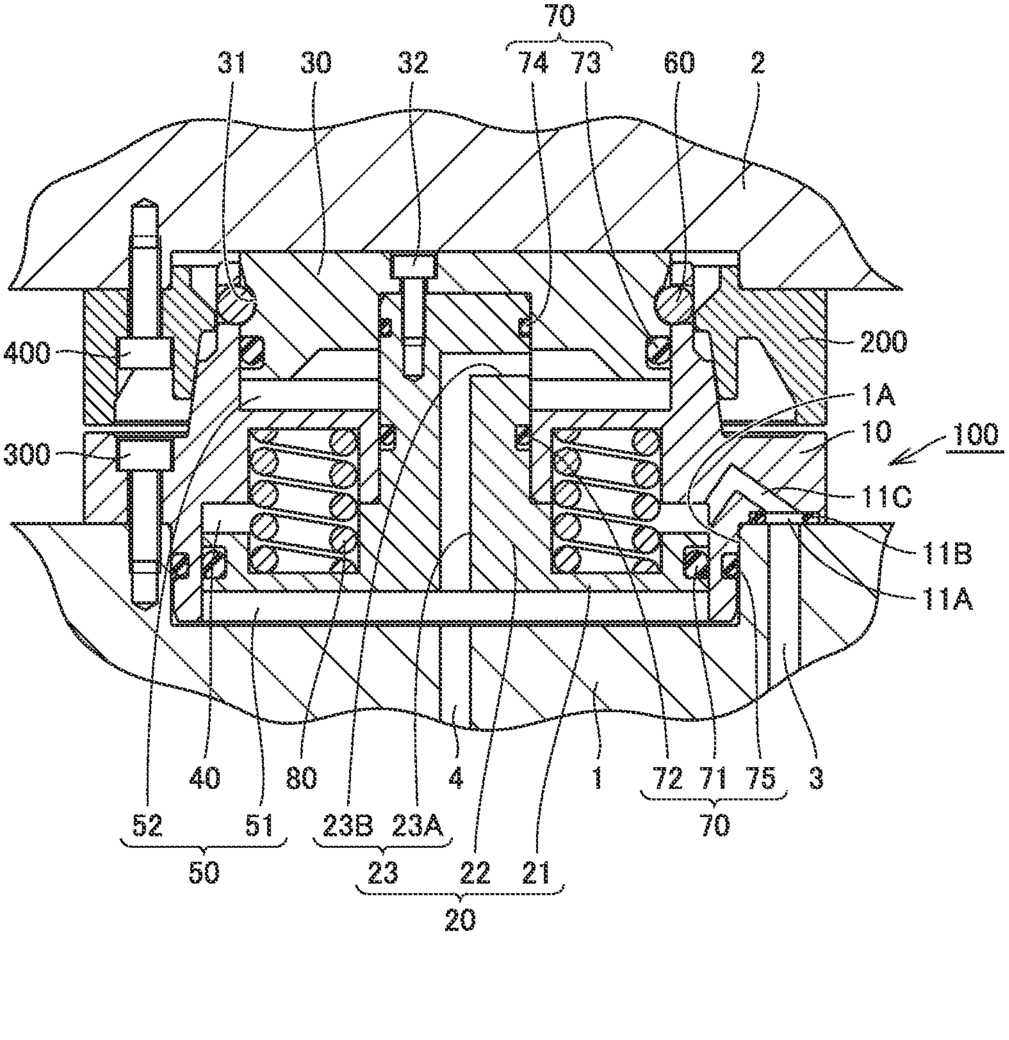
FIG. 1 is a longitudinal cross sectional view showing a first state (unclamping state) of a clamping device according to one embodiment.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly. Further, the present technology is not limited to one that necessarily exhibits all the functions and effects stated in the present embodiment.

It should be noted that in the present specification, the terms "comprise", "include", and "have" are open-end terms. That is, when a certain configuration is included, a configuration other than the foregoing configuration may or may not be included.

Also, in the present specification, when geometric terms and terms representing positional/directional relations are used, for example, when terms such as "parallel", "orthogonal", "obliquely at 45°", "coaxial", and "along" are used, these terms permit manufacturing errors or slight fluctuations. In the present specification, when terms representing relative positional relations such as "upper side" and "lower side" are used, each of these terms is used to indicate a relative positional relation in one state, and the relative positional relation may be reversed or turned at any angle in accordance with an installation direction of each mechanism (for example, the entire mechanism is reversed upside down).

In each of the embodiments described below, a clamping device serving as an exemplary coupling device will be described; however, the scope of the present technology is not limited to the clamping device. The present technology is generally applicable to a coupling device that couples a first member and a second member while positioning them relative to each other. Specifically, for example, the present technology can be applied to: respective mechanisms for replacing a pallet of a machine tool, a chuck of a lathe, and a hand of a robot; respective mechanisms for replacing jigs of a gear processing machine, a measurement machine, an inspection machine, a cleaning machine, a conveying device, an assembling device, and a welding device; and respective mechanisms for replacing molds of a press and an injection molding machine.

Figure 2:
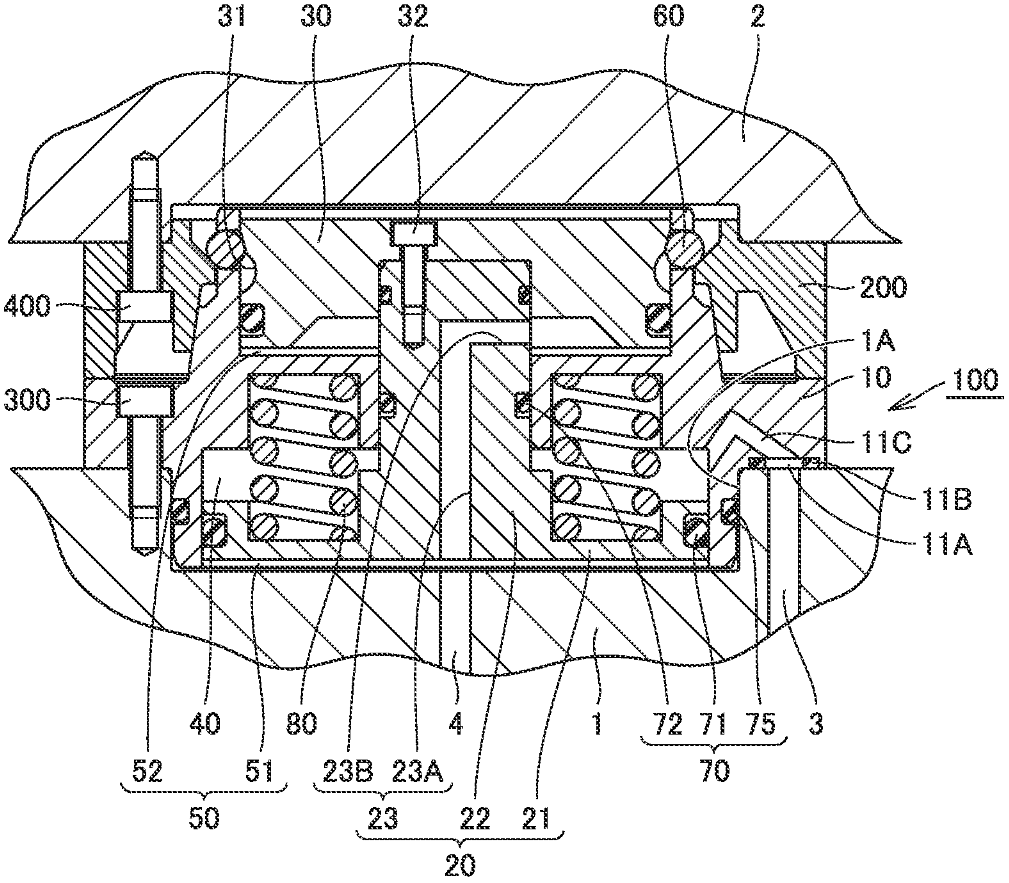
FIG. 2 is a longitudinal cross sectional view showing a second state (clamping state) of the clamping device according to the embodiment.

Each of FIGS. 1 and 2 is a longitudinal cross sectional view showing a clamping device according to the present embodiment. FIG. 1 shows an unclamping state (first state), and FIG. 2 shows a clamping state (second state).

The clamping device according to the present embodiment can fix a movable member 2 (second member/fixation-target object) to a reference member 1 (first member/base body) and can position movable member 2 with respect to reference member 1 (in leftward/rightward direction, upward/downward direction, and depth direction in the plane of sheet in each of FIGS. 1 and 2).

Reference member 1 (first member) is, for example, a table of a machining center or the like. Movable member 2 (second member) is, for example, a work pallet fixed to the table or the like.

A clamping cylinder 100 can be fixed to reference member 1. A ring member 200 (annular member) can be fixed to movable member 2. Clamping cylinder 100 and ring member 200 are fixed to reference member 1 and movable member 2 by fixing members 300, 400 (bolts), respectively. Clamping cylinder 100 and ring member 200 may be fixed by fixing means other than fixing members 300, 400.

Clamping cylinder 100 (fluid pressure cylinder) includes a cylinder main body 10, a first piston member 20, a second piston member 30, a clamping chamber 40, an unclamping chamber 50, steel balls 60 (engagement portion/engagement balls), sealing members 70, and biasing members 80.

A bottom portion of cylinder main body 10 is fitted into a hole portion 1A of reference member 1. By precisely adjusting the position and diameter of hole portion 1A, cylinder main body 10 can be aligned. Cylinder main body 10 has a port 11A. A sealing member 11B is provided to surround port 11A. Port 11A communicates with an air flow path 3 provided in reference member 1.

First piston member 20 includes a piston portion 21, a rod portion 22, and an air path 23. Air path 23 includes: a first portion 23A that extends in the axial direction of rod portion 22; and a second portion 23B that extends from first portion 23A in the radial direction of rod portion 22 and that opens in the outer peripheral surface of rod portion 22.

A recess 31 is formed in an outer periphery of second piston member 30. Second piston member 30 is fixed to the tip side of rod portion 22 of first piston member 20 by a fixing member 32 (bolt). Thus, rod portion 22 connects piston portion 21 of first piston member 20 and second piston member 30. Therefore, first piston member 20 and second piston member 30 are collectively reciprocally movable with respect to cylinder main body 10 in an axial direction (first direction).

Clamping chamber 40 is formed above piston portion 21 of first piston member 20. More specifically, clamping chamber 40 is formed between the upper surface of piston portion 21 of first piston member 20 and cylinder main body 10.

A working fluid for clamping is supplied from air flow path 3 to clamping chamber 40 through port 11A and an air path 11C. Thus, first piston member 20 and second piston member 30 are driven to the fixation side (lower side in the figure; one side in the first direction). The working fluid supplied to clamping chamber 40 can be discharged from air flow path 3 through air path 11C and port 11A. Air is used as the working fluid for clamping, for example; however, the working fluid is not limited to air. Hydraulic pressure may be used instead of air pressure.

Unclamping chamber 50 includes a first unclamping chamber 51 (first cylinder chamber) and a second unclamping chamber 52 (second cylinder chamber) formed to be separated from each other. First unclamping chamber 51 and second unclamping chamber 52 are formed to be separated from each other with clamping chamber 40 being interposed therebetween. First unclamping chamber 51 is formed below piston portion 21 of first piston member 20. More specifically, first unclamping chamber 51 is formed among the bottom surface of hole portion 1A of reference member 1, the inner peripheral surface of cylinder main body 10, and the lower surface of first piston member 20. Second unclamping chamber 52 is formed above clamping chamber 40. More specifically, second unclamping chamber 52 is formed among cylinder main body 10, the outer peripheral surface of rod portion 22 of first piston member 20, and the lower surface of second piston member 30.

A working fluid for unclamping is supplied to first unclamping chamber 51 from air flow path 4 formed in reference member 1. The working fluid for unclamping as supplied to first unclamping chamber 51 is also supplied to second unclamping chamber 52 via air path 23 of first piston member 20. In the example of FIGS. 1 and 2, air flow path 4 and first portion 23A of air path 23 are formed at positions corresponding to the axial center of clamping cylinder 100; however, air flow path 4 and first portion 23A of air path 23 may be formed at positions deviated from the axial center of clamping cylinder 100.

Since the working fluid is supplied to unclamping chamber 50, first piston member 20 and second piston member 30 are driven to the fixation-release side (upper side in the figure; the other side in the first direction). The working fluid supplied to unclamping chamber 50 can be discharged through air flow path 4. Air is used as the working fluid for unclamping, for example; however, the working fluid is not limited to air. Hydraulic pressure may be used instead of air pressure.

It should be noted that the supply of the working medium to unclamping chamber 50 is not limited to the supply of the working medium from air flow path 4 to first unclamping chamber 51. As a modification, for example, the working medium may be supplied from air flow path 4 to second unclamping chamber 52, and may be supplied from second unclamping chamber 52 to first unclamping chamber 51 via air path 23.

Each of steel balls 60 is held by cylinder main body 10 and is located on the inner peripheral side of ring member 200. The plurality of steel balls 60 are provided to be arranged side by side in a peripheral direction of ring member 200. Each of steel balls 60 is held by cylinder main body 10. Further, each of steel balls 60 is received in recess 31 of second piston member 30.

In the unclamping state (first state) shown in FIG. 1, steel ball 60 does not protrude outward in a radial direction of cylinder main body 10, and does not press ring member 200. First piston member 20 and second piston member 30 are biased toward the unclamping side (upper side in FIG. 1) to lift up movable member 2. In this state, movable member 2 can be detached for the purpose of replacement. In the clamping state (second state) shown in FIG. 2, the steel ball protrudes outward in the radial direction of cylinder main body 10, and presses ring member 200 toward reference member 1 (obliquely downward in FIG. 2).

Sealing members 70 include: a sealing member 71 provided on an outer periphery of piston portion 21 of first piston member 20; a sealing member 72 provided between rod portion 22 of first piston member 20 and cylinder main body 10; a sealing member 73 provided on an outer periphery of second piston member 30; a sealing member 74 provided between rod portion 22 of first piston member 20 and second piston member 30; and a sealing member 75 provided between the outer periphery of cylinder main body 10 and reference member 1.

Sealing member 71 seals between clamping chamber 40 and first unclamping chamber 51. Sealing member 72 seals between clamping chamber 40 and second unclamping chamber 52. Each of sealing members 73, 74 seals between second unclamping chamber 52 and outside of cylinder main body 10. Sealing member 75 seals between first unclamping chamber 51 and outside of cylinder main body 10.

Biasing members 80 are accommodated in clamping chamber 40. Biasing members 80 illustrated in FIGS. 1 and 2 are coil springs arranged side by side in the peripheral direction on the outer periphery of rod portion 22. Instead of the coil springs, elastic members such as leaf springs may be used.

Each of biasing members 80 biases piston portion 21 of first piston member 20 and cylinder main body 10 in directions away from each other. Biasing member 80 drives first piston member 20 downward. Therefore, clamping force for fixing movable member 2 can be secured by the biasing force of biasing member 80 in addition to the working fluid pressure for clamping to the inside of clamping chamber 40. This leads to increased clamping force of the clamping device.

In this way, in clamping cylinder 100, the three cylinder chambers, i.e., first unclamping chamber 51 (first cylinder chamber), second unclamping chamber 52 (second cylinder chamber), and clamping chamber 40 (third cylinder chamber), are formed along the upward/downward direction (first direction) in which reference member 1 (first member) and movable member 2 (second member) are arranged side by side. Clamping chamber 40 is provided between first unclamping chamber 51 and second unclamping chamber 52.

The lower side of first unclamping chamber 51 is defined by reference member 1. First unclamping chamber 51 and clamping chamber 40 are partitioned by piston portion 21 of first piston member 20. Clamping chamber 40 and second unclamping chamber 52 are partitioned by cylinder main body 10. The upper side of second unclamping chamber 52 is defined by second piston member 30.

In response to a reciprocal movement of second piston member 30, steel balls 60 are moved in the radial direction (second direction) to switch between the unclamping state and the clamping state.

Figure 3:
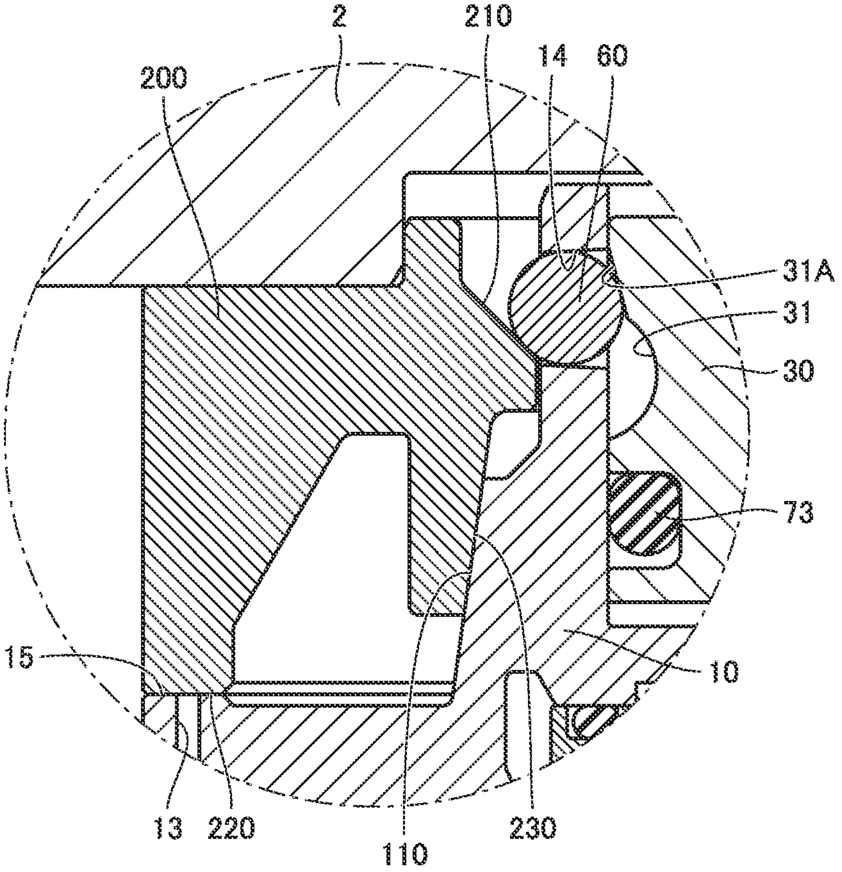
FIG. 3 is an enlarged view of surroundings around an engagement ball in the clamping device shown in FIGS. 1 and 2.

FIG. 3 is an enlarged view of surroundings around steel ball 60 in clamping cylinder 100. As shown in FIG. 3, steel ball 60 is held by a holding portion 14 of cylinder main body 10. Further, an inclined surface 31A is provided on the upper side (the movable member 2 side) with respect to recess 31 of second piston member 30.

During the clamping operation, second piston member 30 is driven to the lower side in FIG. 3, with the result that steel ball 60 is pressed by inclined surface 31A to press an inclined surface 210 of ring member 200 obliquely downward. Thus, ring member 200 is attracted to the lower side in FIG. 3.

Cylinder main body 10 has a reference surface 15. A detection port 13 opens in reference surface 15. In the clamping state, abutment surface 220 of ring member 200 is brought into abutment with reference surface 15 to close detection port 13, with the result that the air supplied from air flow path 6 (see FIG. 6) is not leaked. Thus, air pressure in air flow path 6 is increased. Therefore, by measuring the air pressure in air flow path 6, it is possible to detect whether or not a normal clamping operation is performed. Further, inclination of movable member 2 can be detected by providing a plurality of detection ports 13.

During the unclamping operation, second piston member 30 driven to the upper side in FIG. 3 pushes up movable member 2. In a state in which movable member 2 is not clamped, detection port 13 is open in reference surface 15, with the result that air supplied from air flow path 6 is leaked.

Inner peripheral tapered surface 230 of ring member 200 is brought into abutment with outer peripheral tapered surface 110 of clamping cylinder 100 (cylinder main body 10), thereby attaining positioning in the horizontal direction. When ring member 200 is attracted to the lower side during the clamping operation, an abutment surface 220 of ring member 200 is brought into abutment with reference surface 15 of cylinder main body 10, thereby attaining positioning in the height direction. When an inner peripheral tapered surface 230 of ring member 200 and an outer peripheral tapered surface 110 of clamping cylinder 100 (cylinder main body 10) are each in the form of a polygon taper, positioning can be fully attained by one clamping cylinder 100.

Figure 4:
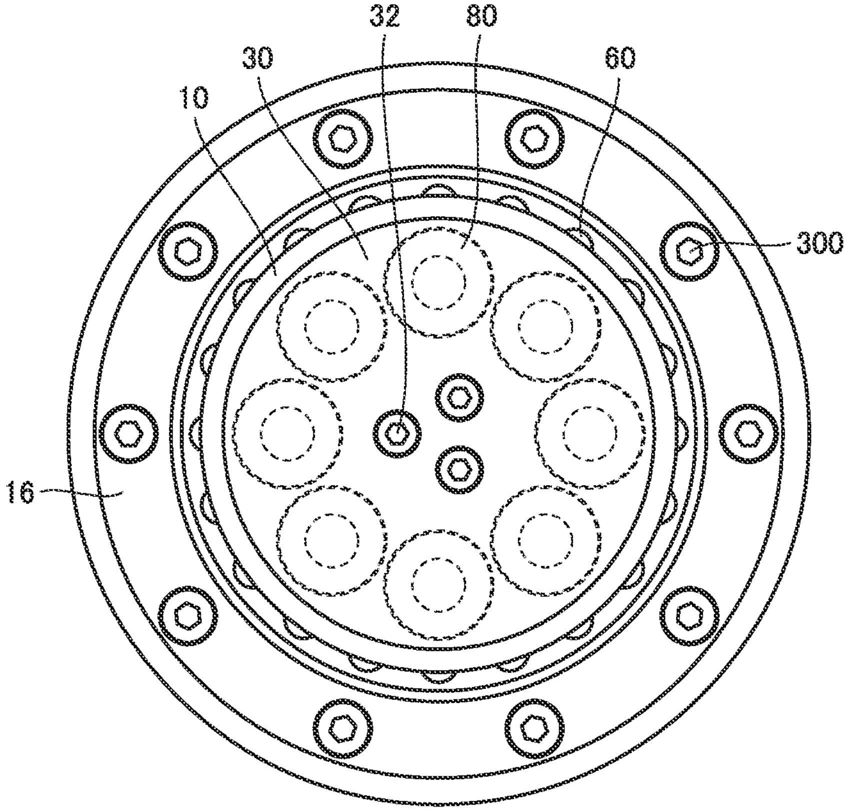
FIG. 4 is a top view of the clamping device shown in FIGS. 1 to 3.

FIG. 4 is a top view of clamping cylinder 100. As shown in FIG. 4, cylinder main body 10 has a flange portion 16 protruding in a direction away from a central axis of cylinder main body 10. Cylinder main body 10 is fixed to reference member 1 by fixing member 300 inserted in flange portion 16. In clamping cylinder 100, by providing the plurality of biasing members 80 in the peripheral direction, total biasing force can be increased without excessively increasing the length of each of biasing members 80. As a result, clamping cylinder 100 can be reduced in size particularly in the height direction (depth direction in the plane of sheet in FIG. 4).

Further, as shown in FIG. 4, since steel balls 60 are arranged on the outer periphery of second piston member 30 that defines second unclamping chamber 52, the number of steel balls 60 arranged in the peripheral direction can be increased as compared with a case where steel balls 60 are disposed on the outer periphery of rod portion 22 of first piston member 20 (i.e., a case where second piston member 30 is not provided). As a result, ring member 200 can be positioned by clamping cylinder 100 more precisely. Further, surface pressure acting on each of steel balls 60 can be reduced, thereby reducing the size of steel ball 60. As a result, clamping cylinder 100 can be reduced in size particularly in the height direction (depth direction in the plane of sheet in FIG. 4).

Figure 5:
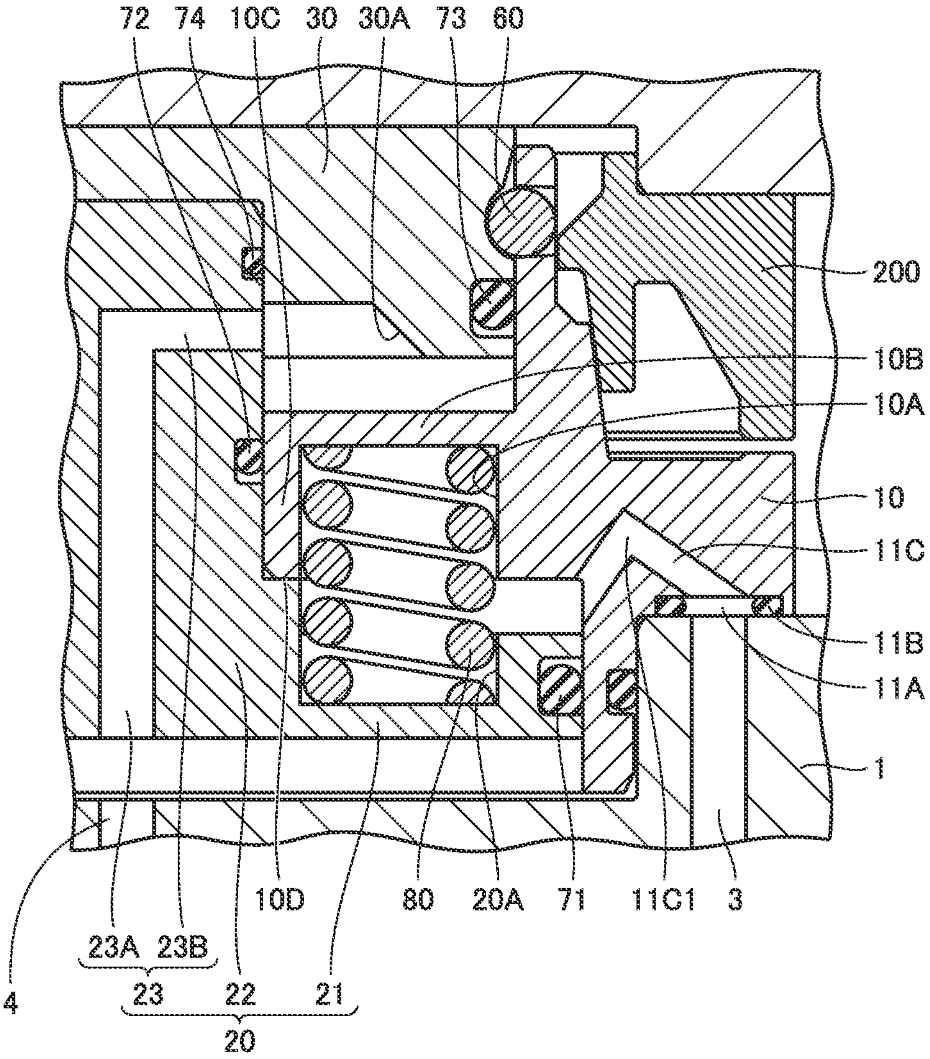
FIG. 5 is an enlarged longitudinal cross sectional view showing a structure around a clamping chamber and an unclamping chamber of the clamping device shown in FIGS. 1 to 4.

FIG. 5 is an enlarged longitudinal cross sectional view showing a structure around clamping chamber 40 and unclamping chamber 50 of clamping cylinder 100.

As shown in FIG. 5, cylinder main body 10 includes: a partition wall portion 10B that partitions clamping chamber 40 and unclamping chamber 50; and a protrusion 10C that protrudes downward (to the first unclamping chamber 51 side) from an inner peripheral end portion of partition wall portion 10B and that guides rod portion 22 of first piston member 20. Cylinder main body 10 forms a recess 10A (first recess) in which partition wall portion 10B serves as a bottom portion and protrusion 10C serves as a side wall. Recess 10A faces piston portion 21 of first piston member 20.

Piston portion 21 of first piston member 20 is provided with a recess 20A (second recess) recessed in a direction away from partition wall portion 10B. Recess 20A faces partition wall portion 10B of cylinder main body 10.

Biasing member 80 is provided between piston portion 21 of first piston member 20 and partition wall portion 10B. Biasing member 80 is accommodated in a space formed by recesses 10A, 20A facing each other. Biasing member 80 biases partition wall portion 10B of cylinder main body 10 and piston portion 21 of first piston member 20 in directions away from each other.

Air path 11C formed in cylinder main body 10 has a bent portion 11C1. Air path 11C extends obliquely upward from port 11A, is curved at a substantially right angle at bent portion 11C1, extends obliquely downward from bent portion 11C1, and reaches clamping chamber 40.

The biasing force of biasing member 80 as well as the air pressure supplied from air flow path 3 to clamping chamber 40 constitute clamping force of clamping cylinder 100. It should be noted that the clamping force may be constituted only of the biasing force of biasing member 80.

The air pressure from air flow path 4 is supplied to first unclamping chamber 51 and second unclamping chamber 52. First piston member 20 and second piston member 30 are driven to the unclamping side (upper side in FIG. 5) against the biasing force of biasing member 80. First piston member 20 and second piston member 30 are raised until the tip of protrusion 10C of cylinder main body 10 is brought into abutment with a stepped portion formed in rod portion 22.

Second piston member 30 is provided with a recess 30A (third recess) recessed in a direction away from partition wall portion 10B of cylinder main body 10. Air path 23 via which first unclamping chamber 51 and second unclamping chamber 52 communicate with each other communicates with second unclamping chamber 52 in a region located in recess 30A. It should be noted that in the example of FIG. 5, the whole of second portion 23B of air path 23 is located in recess 30A; however, a case where a portion of second portion 23B of air path 23 in the height direction of second portion 23B is located in recess 30A should be interpreted as "air path 23 communicates with second unclamping chamber 52 in a region located in recess 30A".

In the present embodiment, unclamping chamber 50 is formed to be divided into two parts, i.e., first unclamping chamber 51 and second unclamping chamber 52, and the two members, i.e., first piston member 20 and second piston member 30 are driven, thereby increasing the driving force on the unclamping side. The driving on the unclamping side is performed against the biasing force of biasing member 80. Hence, the biasing force of biasing member 80 can be increased as the driving force on the unclamping side is increased. By increasing the biasing force of biasing member 80, the driving force on the clamping side can be increased. As a result, the clamping force of clamping cylinder 100 can be increased.

In the present embodiment, it has been illustratively described that one clamping chamber 40 is formed, biasing member 80 is provided in clamping chamber 40, and unclamping chamber 50 is formed to be divided into two parts; however, there may be employed such a configuration that clamping chamber 40 is formed to be divided into two parts, one unclamping chamber 50 is provided, and biasing member 80 is provided in unclamping chamber 50.

Figure 6:
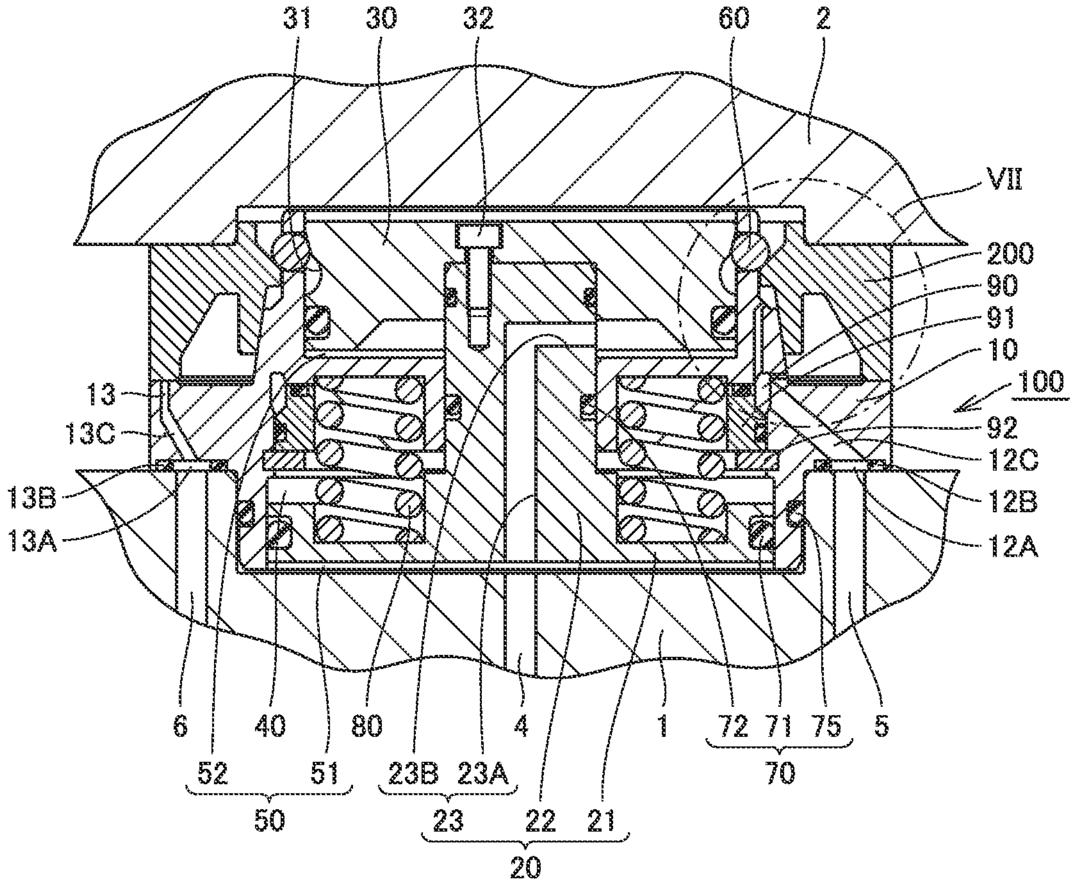
FIG. 6 is a longitudinal cross sectional view of a clamping device according to a modification.

FIG. 6 is a longitudinal cross sectional view of a clamping cylinder 100 according to a modification. A structure shown in FIG. 6 is, of course, applicable to clamping cylinder 100 shown in FIGS. 1 to 5. In the example shown in FIG. 6, cylinder main body 10 has ports 12A, 13A. Sealing members 12B, 13B are provided to surround ports 12A, 13A, respectively. Ports 12A, 13A respectively communicate with air flow paths 5, 6 provided in reference member 1.

Cylinder main body 10 has air paths 12C, 13C that communicate with ports 12A, 13A, respectively. Air path 12C reaches an air blow chamber 90. Air blow chamber 90 is formed between the inner periphery of cylinder main body 10 and a fitting member 91. Fitting member 91 is fixed to cylinder main body 10 by a stopping ring 92. Air path 13C opens to the outside of cylinder main body 10 through detection port 13.

Figure 7:
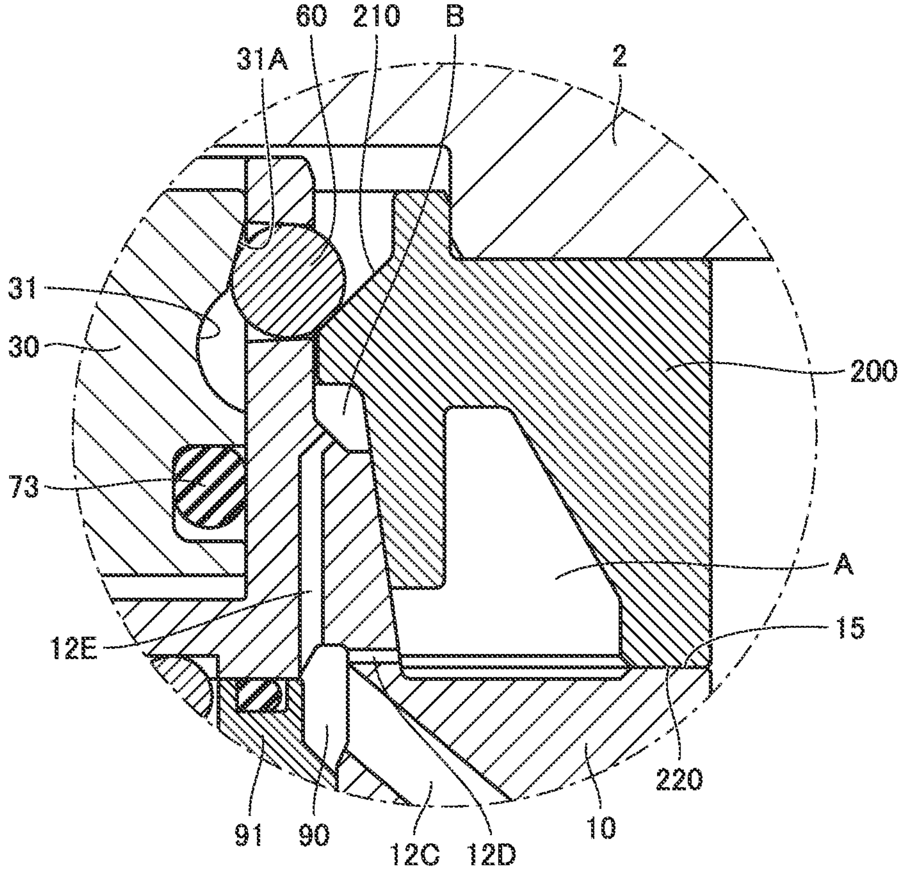
FIG. 7 is an enlarged view of a portion VII in FIG. 6.

FIG. 7 is an enlarged view of a portion VII in FIG. 6. As shown in FIG. 7, air blow chamber 90 communicates with spaces A, B, which are external to cylinder main body 10, through air paths 12D, 12E, respectively. Air supplied to air blow chamber 90 is discharged from air paths 12D, 12E toward spaces A, B. Thus, chips, coolant, or the like can be prevented from entering the inside of cylinder main body 10.

Although the embodiments of the present technology have been described and illustrated in detail, it is clearly understood that the same is by way of illustration and example only and is not to be taken by way of limitation. The scope of the present technology is defined by the terms of the claims, and is intended to include any modifications within the scope and meaning equivalent to the terms of the claims.

REFERENCE SIGNS LIST

1: reference member; 1A: hole portion; 2: movable member; 3, 4, 5, 6: air flow path; 10: cylinder main body; 10A: recess; 10B: partition wall portion; 10C: protrusion; 11A, 12A, 13A: port; 11B, 12B, 13B: sealing member; 11C, 12C, 12D, 12E, 13C: air path; 11C1: bent portion; 13: detection port; 14: holding portion; 15: reference surface; 16: flange portion; 20: first piston member; 20A: recess; 21: piston portion; 22: rod portion; 23: air path; 23A: first portion; 23B: second portion; 30: second piston member; 30A: recess; 31: recess; 31A: inclined surface; 32: fixing member; 40: clamping chamber; 50: unclamping chamber; 51: first unclamping chamber; 52: second unclamping chamber; 60: steel ball; 70, 71, 72, 73, 74, 75: sealing member; 80: biasing member; 90: air blow chamber; 91: fitting member; 92: stopping ring; 100: clamping cylinder; 110: outer peripheral tapered surface; 200: ring member; 210: inclined surface; 220: abutment surface; 230: inner peripheral tapered surface; 300, 400: fixing member.

The invention claimed is:

1. A coupling device that is able to couple a first member and a second member while positioning the first member and the second member with respect to each other, the coupling device comprising a fluid pressure cylinder fixed to the first member, wherein the fluid pressure cylinder includes a cylinder main body, a first piston and a second piston each reciprocally movable with respect to the cylinder main body along a first direction, and a biasing member that drives each of the first piston and the second piston to one side in the first direction, the cylinder main body has a first cylinder chamber that drives the first piston to the other side in the first direction, and a second cylinder chamber that is formed to be separated from the first cylinder chamber and that drives the second piston to the other side, and the first piston and the second piston are connected together allowing for simultaneous movement.

2. The coupling device according to claim 1, wherein the biasing member is provided between the first cylinder chamber and the second cylinder chamber in the first direction.

3. The coupling device according to claim 1, wherein the cylinder main body further has a third cylinder chamber that is provided between the first cylinder chamber and the second cylinder chamber and that drives each of the first piston and the second piston to the one side in the first direction, and the biasing member is accommodated in the third cylinder chamber.

4. The coupling device according to claim 3, wherein the cylinder main body further has a partition wall portion that partitions the second cylinder chamber and the third cylinder chamber, and the biasing member is provided between the partition wall portion and the first piston.

5. The coupling device according to claim 4, wherein the cylinder main body is provided with a first recess recessed in a direction away from the first piston, the first piston is provided with a second recess recessed in a direction away from the partition wall portion, and the biasing member is provided to be accommodated in each of the first recess and the second recess.

6. The coupling device according to claim 1, wherein the fluid pressure cylinder further includes a rod portion that extends along the first direction and that connects the first piston and the second piston, and a path via which the first cylinder chamber and the second cylinder chamber communicate with each other is formed in the rod portion.

7. The coupling device according to claim 1, further comprising an annular member fixed to the second member, wherein the fluid pressure cylinder further includes an engagement portion that is able to be located on an inner peripheral side of the annular member and that is able to switch between a first state and a second state in response to a reciprocal movement of each of the first piston and the second piston, the first state being a state in which the annular member is not pressed, the second state being a state in which the annular member is pressed to the first member side.

8. The coupling device according to claim 7, wherein the engagement portion is moved in a second direction orthogonal to the first direction in response to a movement of the second piston.

9. A clamping device that is able to fix a second member to a first member, the clamping device comprising a fluid pressure cylinder fixed to the first member, wherein the fluid pressure cylinder includes a cylinder main body, a first piston and a second piston each reciprocally movable with respect to the cylinder main body along a first direction, and a biasing member that drives each of the first piston and the second piston to one side in the first direction, the cylinder main body has a first cylinder chamber that drives the first piston to the other side in the first direction, and a second cylinder chamber that is formed to be separated from the first cylinder chamber and that drives the second piston to the other side, and the first piston and the second piston are connected together allowing for simultaneous movement.

10. The coupling device according to claim 1, wherein the first piston and the second piston are collectively reciprocally movable with respect to the cylinder main body in the first direction.

11. The coupling device according to claim 1, wherein a bottom portion of the cylinder main body is fitted into a hole portion of the first member, and the first cylinder chamber is defined by a bottom surface of the hole portion, an inner peripheral surface of the cylinder main body, and a lower surface of the first piston.

12. The coupling device according to claim 1, wherein the fluid pressure cylinder further includes a rod portion that extends along the first direction and connects the first piston and the second piston, and the second cylinder chamber is defined by the cylinder main body, an outer peripheral surface of the rod portion, and a lower surface of the second piston.

* * * * *